United States Patent [19]
Hennes et al.

[11] Patent Number: 5,443,243
[45] Date of Patent: Aug. 22, 1995

[54] SUPPORT FOR A DEVICE FOR INSPECTING A SET OF WHEELS

[75] Inventors: Jacques Hennes, Ezy sur Eure; Jean-Pierre Ancelin, Mesnil sur l'Estree, both of France

[73] Assignee: Facom, Morangis Cedex, France

[21] Appl. No.: 115,711

[22] Filed: Sep. 3, 1993

[30] Foreign Application Priority Data

Sep. 4, 1992 [FR] France .................. 92 10606

[51] Int. Cl.⁶ ............................... B66F 3/24
[52] U.S. Cl. ................................ 254/93 R
[58] Field of Search .......... 29/273; 414/426–430, 414/225; 254/93 R, 45; 73/65.07, 460, 468–470

[56] References Cited

U.S. PATENT DOCUMENTS

| | | | |
|---|---|---|---|
| 4,042,139 | 8/1977 | Pernsteiner et al. | 29/273 |
| 4,841,632 | 6/1989 | Namiki et al. | 29/273 |
| 4,930,966 | 6/1990 | Chien | 29/273 |
| 5,244,331 | 9/1993 | Ruhl | 29/273 |

*Primary Examiner*—Robert C. Watson
*Attorney, Agent, or Firm*—Wenderoth, Lind & Ponack

[57] ABSTRACT

A support for a device for inspecting a set of wheels includes a mounting frame that carries a device for mounting the frame on a respective wheel. Another device carried by the frame thrusts against the wheel a plate provided with a series of bearing pegs parallel to an axis of the support.

27 Claims, 3 Drawing Sheets

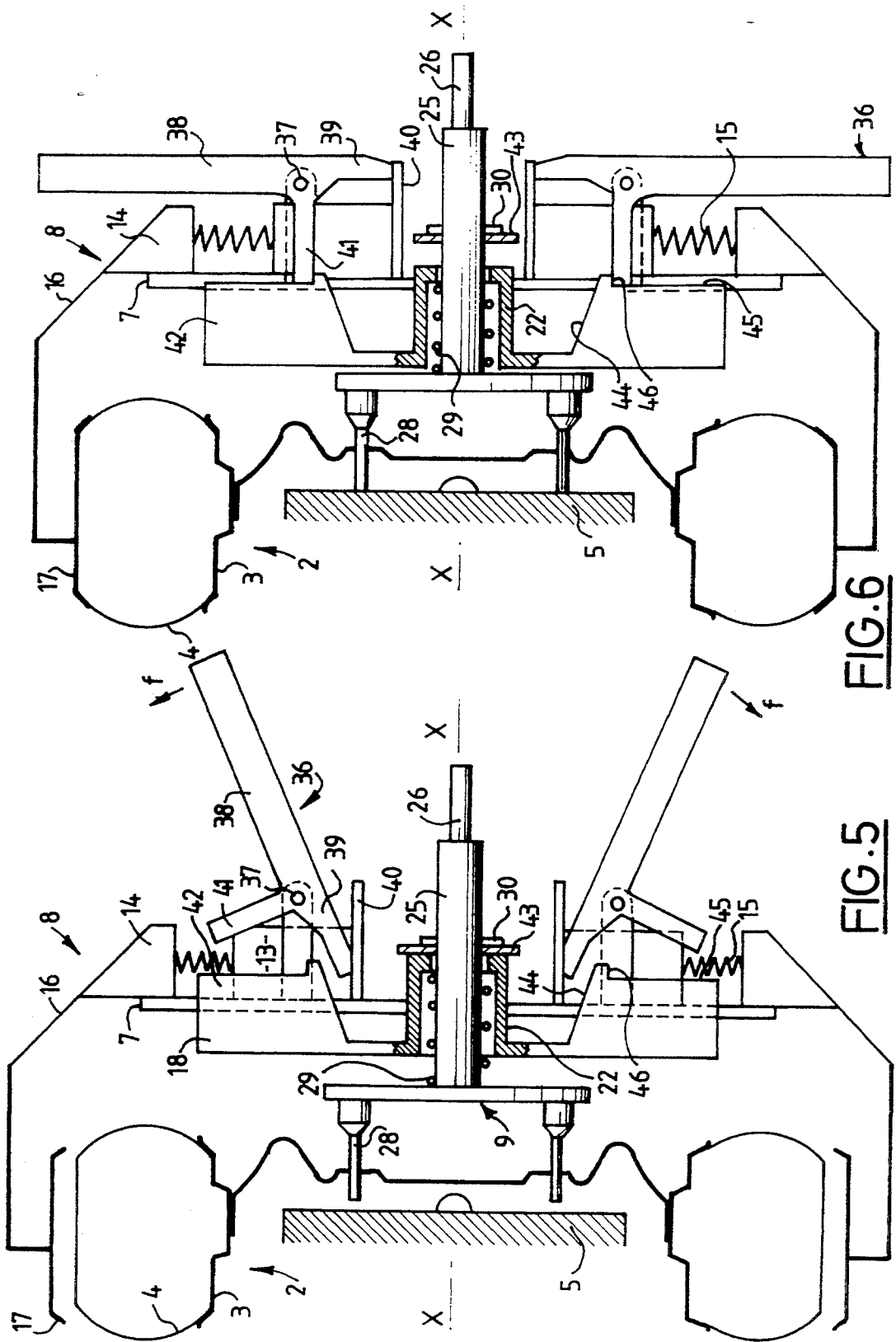

SUPPORT FOR A DEVICE FOR INSPECTING A SET OF WHEELS

BACKGROUND OF THE INVENTION

The present invention relates to a support for a device for inspecting a set of wheels.

Devices for inspecting sets of wheels must be capable of being used without dismounting the wheels. If it is desired, in order to reduce the time required for the inspection, to avoid any "antiwarp" operation consisting in effecting two measurements in two angular positions of the wheels offset 180°, the support of the inspection device must be capable of being supported in a reliable manner on an unwarped surface, in practice on the wheel hub.

SUMMARY OF THE INVENTION

An object of the invention is to achieve this in a simple and cheap manner.

The invention therefore provides a support for a device for inspecting a set of wheels. The support includes a mounting frame which carries:

a device for mounting the frame on the wheel, and a device for thrusting toward the wheel a plate provided with a series of bearing pegs parallel to the axis of the support.

According to other features of the invention:

the support includes means for sequentially actuating the mounting device and then the thrust device;

the mounting device and the thrust device each comprise a fluid-actuated jack, one end of the jack of the mounting device being connectable to a source of fluid under pressure and an intermediate point of the body of the jack being connected to an end of the jack of the thrust device;

the jacks are single-acting and returned by springs;

the mounting device and the thrust device each comprise an electrically-actuated screw jack, the jack of the mounting device comprising means for opening, at the end of the travel of the jack, its electric supply circuit and simultaneously closing that of the jack of the thrust device;

means are provided for sequentially actuating the jacks in the reverse order for withdrawing the support from the wheel at the end of the inspection of the set of wheels;

the support comprises a lever pivotally mounted on the frame and having two actuating branches, a first branch acting on an arm for mounting the support on the wheel and a second branch being adapted to act on the plate after a predetermined travel of the lever;

the two actuating branches are perpendicular to each other;

two levers are provided which are symmetrically mounted relative to the axis of the support;

the mounting device and/or the thrust device act on the wheel and/or on the plate through the medium of a spring.

BRIEF DESCRIPTION OF THE DRAWINGS

Embodiments of the invention will now be described with reference to the accompanying drawings in which:

FIGS. 5 and 6 are views similar to FIGS. 1 and 2 respectively of a third embodiment of the support according to the invention.

DETAILED DESCRIPTION OF THE INVENTION

Figure 1:
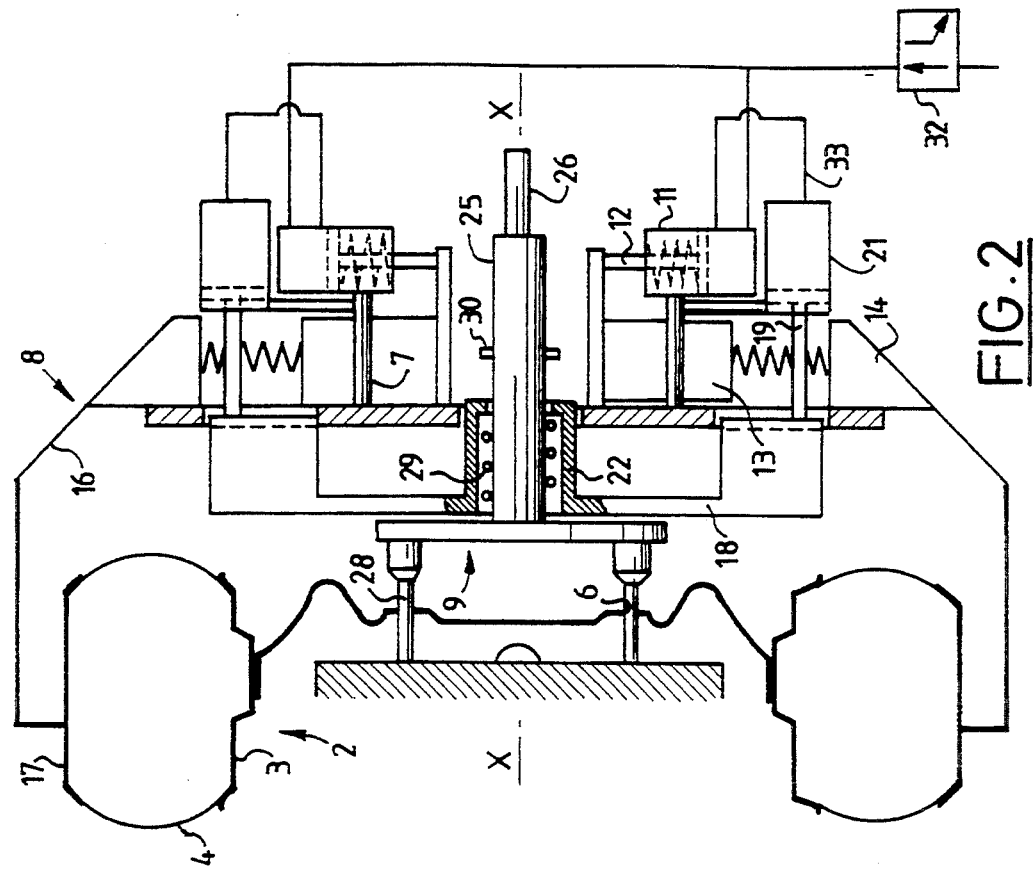
FIG. 1 is a diagrammatic view of a first embodiment of the support according to the invention, shown in a state of rest.

The support 1 shown in FIG. 1 is adapted to carry a measuring device (not shown) for inspecting the geometry of a set of wheels of which a wheel 2 is part and consists of a rim 3 and a tire 4 carried by the latter. The rim is fixed to a hub 5 having an axis X—X which is assumed to be horizontal, by means of a ring arrangement of bolts (not shown). These bolts extend through apertures in the rim which includes other apertures 6, for example three, four or five apertures located at the same distance from the axis X—X as the apertures for the bolts. The support 1 enables the measuring device to be mounted in a manner perfectly coaxial with the axis X—X.

The support 1 comprises a mounting frame 7, a device 8 for mounting the frame on the wheel, and a device 9 for thrusting the support against the hub. Hereinafter, the side of the support facing toward the wheel will be termed the "front" side and the opposite side will be termed the "rear" side.

The mounting device 8 comprises two assemblies which are symmetrical relative to the axis X—X and each include a fluid-actuated jack 10 having a radial orientation and comprising a body 11 fixed to the frame and a piston rod 12 projecting from the body in a direction toward the axis X—X. The free end of this rod is rigidly connected to a slide 13 radially slidably mounted on the frame 7 in a slideway (not shown) of the latter. Slidable in the radially outer part of this slideway is a block 14 connected to the slide by a spring 15. An arm 16 for mounting on the tire 4 and provided at its free end with a claw 17 is rigidly connected to the block 14.

The thrust device 9 comprises a thrust spider 18 rigidly connected to the piston rod 19 of a plurality of thrust jacks 20 each having a body fixed to the frame 7 and an axis parallel to the axis X—X. In its center, the spider 18 has on the rear side a blind cylindrical sleeve 22 having an axis X—X which is slidable in the frame 7 and is open on the front side, the inner end 23 of this sleeve defining an opening 24.

A cylindrical center shaft 25 extends through the sleeve 22, is slidably guided in the opening 24 and defines at its rear end a cylindrical bearing surface 26 of reduced diameter on which the measuring device may be fixed. At its other end, the shaft 25 carries a radial plate 27 from which forwardly extend a ring arrangement of thrust pegs 28 which are parallel to the axis X—X and are in a number not exceeding the number of apertures 6 in the rim. A compression spring 29 is mounted around the shaft 25 and bears, on one hand, against the plate 27 and, on the other hand, against the inner end 23. The forward travel of the shaft 25 relative to the spider 18 under the action of the spring 29 is limited by the fact that a diametrical pin 30 extending through the shaft 25 abuts against the end 23 of the sleeve 22.

A driving fluid, for example compressed air, is supplied through a pipe 31 which is connected in parallel to the inner end of the body 11 of the two jacks 10 and is provided with a control valve 32 having two positions (namely fluid supply and discharge to the air). An intermediate point of each body 11 is permanently connected to the inner end of the body 21 of at least one jack 20 through a pipe 33.

The jacks 10 and 20 are single-acting jacks and are biased to the retracted positions of their piston rods by springs 34 and 35 respectively.

The support just described operates in the following manner:

Initially (FIG. 1), the valve 32 is in its "discharge to the air" position. The piston rods of the jacks 10 and 20 are therefore both retracted so that the arms 16 are in their radially outermost position in which the distance between the two claws 17 exceeds the outside diameter of the tire 4 and the spider 18 is in its rearmost position, for example bearing against the frame 7. Further, the compression of the spring 29 maintains the pin 30 of the shaft 25 against the inner end 23 of the sleeve 22.

In this state, the support 1 is brought in front of the wheel and the pegs 28 are slightly inserted, substantially without clearance, in the corresponding apertures 6 of the rim until the claws 17 are in facing relation to the tire.

The valve 32 is then switched to the "supply" position which first of all supplies fluid to the two jacks 10. The extension of the piston rods of the latter brings the claws 17 to a firm gripping position on the tire and, thenceforth, it is the wheel itself which carries the whole of the support 1.

When the pistons of the jacks 10 have travelled through a predetermined travel, they uncover the ports or orifices of the pipes 33 and the pressure is then simultaneously communicated to all the jacks 20. The latter consequently cause the spider 18 to move in the forward direction and this spider, in compressing the spring 29 in turn urges the pegs 28 through the apertures 6 until they bear against the confronting surface of the hub 5.

In the final position reached in this way, all the pegs firmly bear against the hub and this guarantees a perfect coaxial position of the bearing surface 26 with respect to the axis X—X. The measuring device can now be mounted on this bearing surface 26 for the purpose of carrying out a reliable inspection of the set of wheels with no operation for taking into account any warping of the wheels being necessary.

When the set of wheels has been inspected, the switching of the valve 32 enables the piston rods of the jacks 10 and 20 to retract under the action of their return springs and thereby withdraw the support 1 from the respective wheel. If desired, means (not shown) may be provided for achieving a sequential retraction of the piston rods of the jacks 20 and then the jacks 10.

Figure 2:
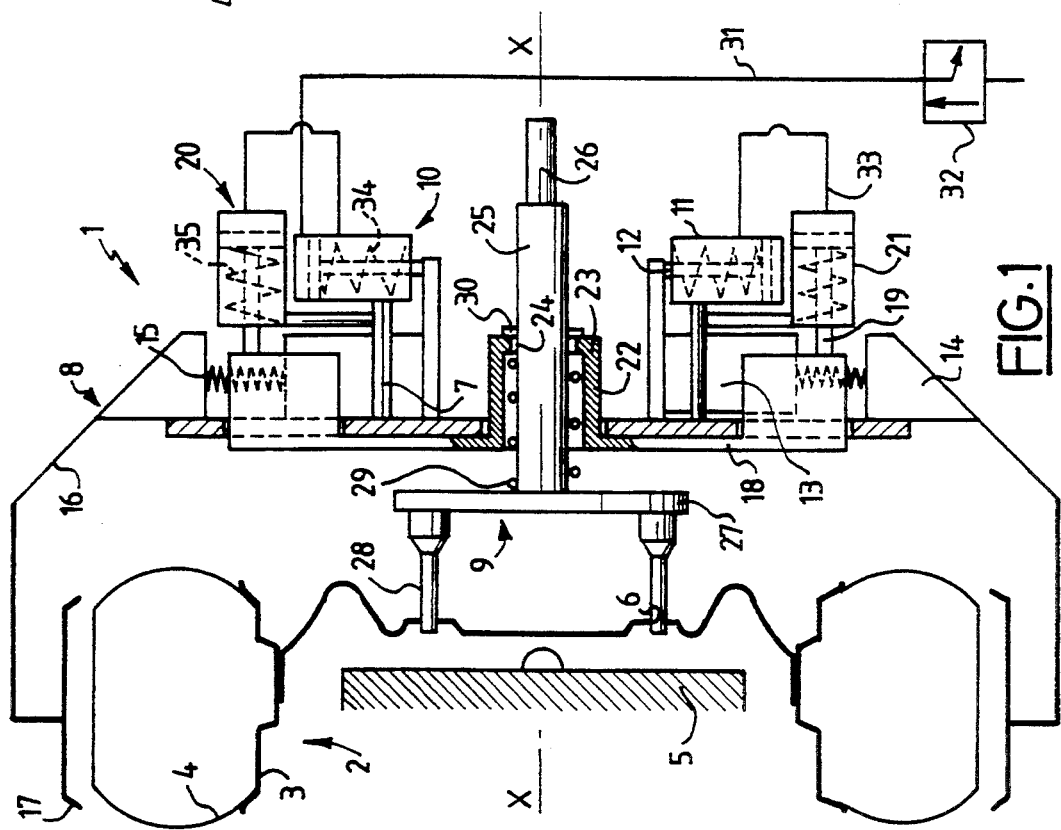
FIG. 2 is a similar view of the support mounted on a wheel of a set of wheels to be inspected.
Figure 4:
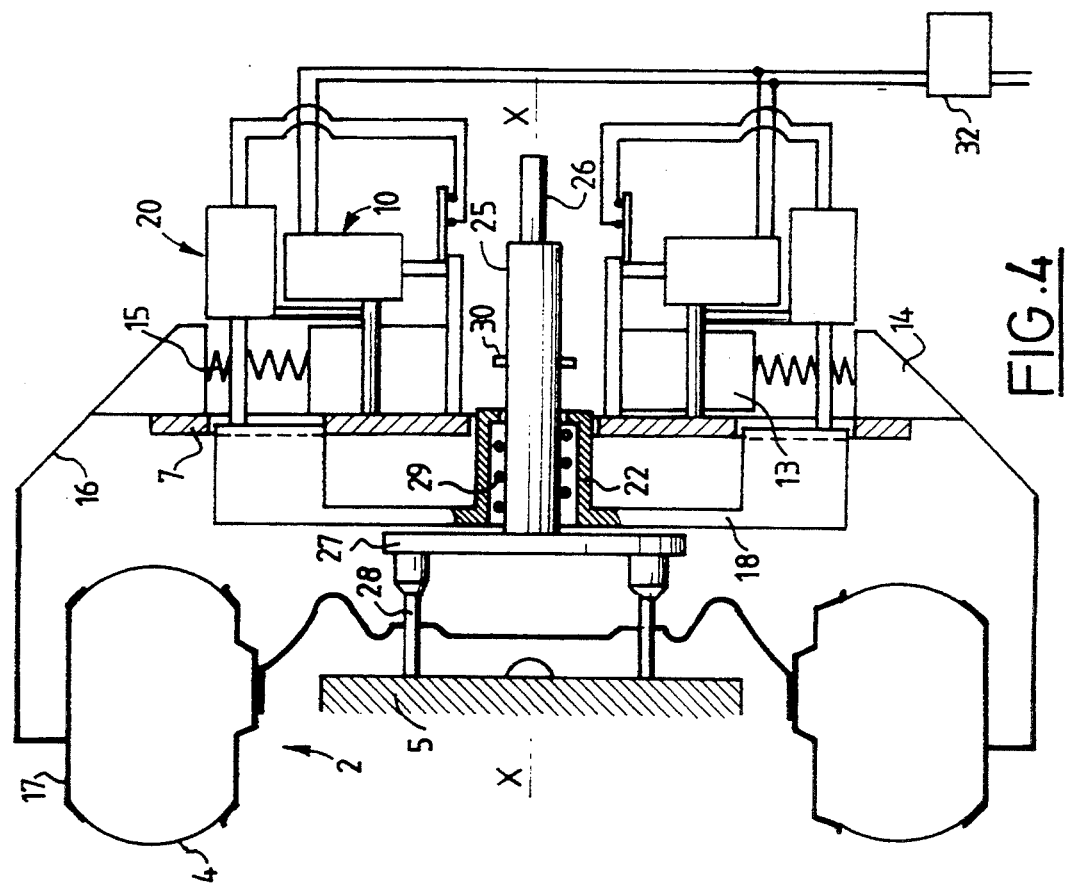
FIGS. 3 and 4 are views similar to FIGS. 1 and 2 respectively of a second embodiment of the support according to the invention.
Figure 3:
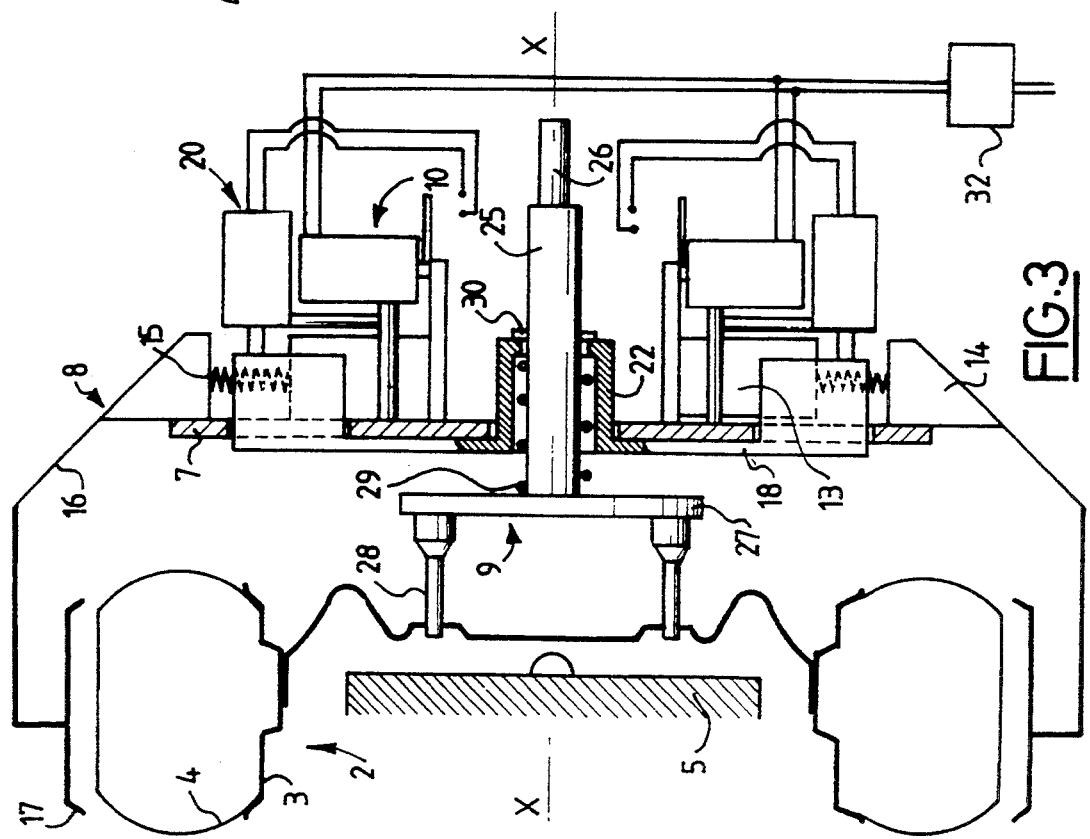

The embodiment shown in FIGS. 3 and 4 differs from that shown in FIGS. 1 and 2 only by the fact that the fluid jacks are replaced by electrically-actuated screw jacks. Corresponding elements carry the same reference characters as those employed in FIGS. 1 and 2.

To achieve a sequential actuation (mounting and then axial thrust) as before, the closure of the general switch 32 supplies current solely to the jacks 10. When the piston rods of the latter have been extended to a predetermined extent, or when a predetermined resisting force has been reached, suitable end-of-travel devices cut off the electric supply to the jacks 10 and supply current to the jacks 20, as diagrammatically represented in FIG. 4. Again, suitable end-of-travel devices cut off the supply of current to the jacks 20 after a predetermined extension travel or when a predetermined resisting force has been reached.

In this case, after the inspection of the set of wheels, a reverse supply of current is required to cause the plate 27 to withdraw and then separate the arms 16. The electric circuit therefore includes suitable means (not shown) for carrying out these operations.

The embodiment shown in FIGS. 5 and 6 differs from the foregoing embodiments in that the sequential actuation of the slides 13 and then the spider 18 is obtained manually in a purely mechanical manner.

For this purpose, there is provided for each half of the device 8 a lever 36 pivotally mounted relative to the frame 7 in the vicinity of the slide 13 on a pin 37 perpendicular to the axis X—X. This lever has a long rearwardly extending shifting branch 38 and two much shorter actuating branches, namely a branch 39 forwardly extending the branch 38 and bearing against the radially outer face of a plate 40 which is parallel to the axis X—X and fixed to the slide 13, and a branch 41 which is perpendicular to the branch 39 and extends radially outwardly substantially from the pin 37.

Further, in the plane of each lever 36, the spider 18 has a rearwardly extending projection 42 extending through the frame 7. Weak return springs (not shown) bear against the frame 7 and bias the slides 13 radially outwardly, and a washer 43 whose diameter is larger than the outside diameter of the sleeve 22 is interposed between the latter and the pin 30. Consequently, the axial travel of the frame 7 is limited in the forward direction by the spider 18 and in the rearward direction by the washer 43.

At rest (FIG. 5), the branch 39 of each lever is sandwiched between the plate 40 and an oblique cam surface 44 on the projection 42, while the branch 41 is free and spaced away from this projection.

After having inserted the pegs 28 in the apertures 6 of the rim (FIG. 5), the operator causes these pegs to bear against the hub and then moves the two branches 38 away from each other in the direction of the arrows f shown in FIG. 5.

In a first stage, the two branches 39 urge the two slides 13 radially inwardly so that the claws 17 are brought to a position of firm engagement with the tire. When this engagement has been ensured, the two branches 41 simultaneously come into contact with a radial surface 45 of the projections 42 and have possibly pushed back the frame 7. Continuing to swing the two levers causes the spider 18 to be thrust toward the wheel while compressing the spring 29 and at the same time strengthens the grip of the claws 17 on the tire.

The final position, which is stable owing to the positioning of the branches 39 and 41 relative to the pins 37, is illustrated in FIG. 6. The two branches 41 are parallel to the axis X—X and abut against a radial shoulder 46 on the projections 42, and the branches 38 and 39 are perpendicular to this axis.

As will be understood, the reverse movement of the two levers causes, in a first stage, the withdrawal of the plate 27 then, in a second stage, the separation of the arms 16 so that the support 1 may be withdrawn from the wheel.

What is claimed is:

1. A support for a device for inspecting a set of wheels, said support having an axis and comprising in combination:

a mounting frame which carries:
a device for mounting said frame on the respective wheel, said mounting device comprising an arm for mounting said support on the wheel;
a device for thrusting toward the wheel a plate provided with a series of bearing pegs parallel to said axis of said support;
means for sequentially actuating said mounting device and then said thrust device; and
a lever pivotally mounted on said frame and having a first actuating branch and a second actuating branch, said first branch being cooperative with said mounting arm for mounting said support on said wheel, and said second branch being cooperative with and acting on said plate after a predetermined travel of said lever.

2. A support according to claim 1, wherein said two actuating branches are substantially perpendicular to each other.

3. A support according to claim 2, comprising two of said lever mounted symmetrically relative to said axis of said support.

4. A support according to claim 1, comprising two of said lever mounted symmetrically relative to said axis of said support.

5. A support for a device inspecting a set of wheels, said support having an axis and comprising in combination:
a mounting frame which carries:
a device for mounting said frame on the respective wheel; and
a device for thrusting toward the wheel a plate provided with a series of bearing pegs parallel to said axis of said support, said mounting device being operable to act on the wheel through the medium of a spring.

6. A support according to claim 5, further comprising means for sequentially actuating said mounting device and then said thrust device.

7. A support according to claim 6, wherein said mounting device and said thrust device each comprise a fluid jack having a body, said body of said jack of said mounting device having an end orifice for connection to a source of fluid under pressure and an intermediate orifice which is connected through a pipe to an end orifice of said body of said jack of said thrust device.

8. A support according to claim 7, wherein said jacks are single-acting jacks returned by springs.

9. A support according to claim 7, comprising means for sequentially actuating in a reverse order said jacks for withdrawing said support from the wheel when the set of wheels has been inspected.

10. A support according to claim 6, wherein said mounting device and said thrust device each comprise an electrically actuated screw jack, an electric current supply circuit for each of said jacks, said jack of said mounting device comprising means for, at the end of travel of said jack of said mounting device, opening said current supply circuit and simultaneously closing said current supply circuit of said jack of said thrust device.

11. A support according to claim 10, comprising means for sequentially actuating in a reverse order said jacks for withdrawing said support from the wheel when the set of wheels has been inspected.

12. A support according to claim 6, wherein said mounting device comprises an arm for mounting said support on the wheel, said support further comprising a lever pivotally mounted on said frame and having a first actuating branch and a second actuating branch, said first branch being cooperative with said mounting arm for mounting said support on the wheel, and said second branch being cooperative with and acting on said plate after a predetermined travel of said lever.

13. A support according to claim 12, wherein said two actuating branches are substantially perpendicular to each other.

14. A support according to claim 13, comprising two of said lever mounted symmetrically relative to said axis of said support.

15. A support according to claim 5, comprising two of said lever mounted symmetrically relative to said axis of said support.

16. A support for a device for inspecting a set of wheels, said support having an axis and comprising in combination:
a mounting frame which carries:
a device for mounting said frame on the respective wheel; and
a device for thrusting toward the wheel a plate provided with a series of bearing pegs parallel to said axis of said support, said thrust device being operable to act on said plate through the medium of a spring.

17. A support according to claim 16, further comprising means for sequentially actuating said mounting device and then said thrust device.

18. A support according to claim 17, wherein said mounting device and said thrust device each comprise a fluid jack having a body, said body of said jack of said mounting device having an end orifice for connection to a source of fluid under pressure and an intermediate orifice which is connected through a pipe to an end orifice of said body of said jack of said thrust device.

19. A support according to claim 18, wherein said jacks are single-acting jacks returned by springs.

20. A support according to claim 18, comprising means for sequentially actuating in a reverse order said jacks for withdrawing said support from the wheel when the set of wheels has been inspected.

21. A support according to claim 17, wherein said mounting device and said thrust device each comprise an electrically actuated screw jack, an electric current supply circuit for each of said jacks, said jack of said mounting device comprising means for, at the end of the travel of said jack of said mounting device, opening said current supply circuit and simultaneously closing said current supply circuit of said jack of said thrust device.

22. A support according to claim 21, comprising means for sequentially actuating in a reverse order said jacks for withdrawing said support from the wheel when the set of wheels has been inspected.

23. A support according to claim 17, wherein said mounting device comprises an arm for mounting said support on the wheel, said support further comprising a lever pivotally mounted on said frame and having a first actuating branch and a second actuating branch, said first branch being cooperative with said mounting arm for mounting said support on the wheel, and said second branch being cooperative with and acting on said plate after a predetermined travel of said lever.

24. A support according to claim 23, wherein said two actuating branches are substantially perpendicular to each other.

25. A support according to claim 24, comprising two of said lever mounted symmetrically relative to said axis of said support.

26. A support according to claim 16, comprising two of said lever mounted symmetrically relative to said axis of said support.

27. A support according to claim 16, wherein said mounting device acts on the wheel through the medium of a spring.

* * * * *